United States Patent [19]

Motz

[11] 4,226,961

[45] Oct. 7, 1980

[54] TRANSPARENT COMPOSITIONS OF BISPHENOL-A-POLYCARBONATE, POLYALKYLENE TEREPHTHALATE AND AN AROMATIC POLYESTER CARBONATE

[75] Inventor: Gary S. Motz, Wadesville, Ind.

[73] Assignee: General Electric Company, Pittsfield, Mass.

[21] Appl. No.: 65,517

[22] Filed: Aug. 10, 1979

Related U.S. Application Data

[63] Continuation of Ser. No. 869,529, Jan. 16, 1978, abandoned.

[51] Int. Cl.² ............................................. C08L 67/02
[52] U.S. Cl. ..................................... 525/439; 525/444
[58] Field of Search ............................... 525/439, 444

[56] References Cited

U.S. PATENT DOCUMENTS

| | | | |
|---|---|---|---|
| 3,028,365 | 4/1962 | Schnell et al. | 528/196 |
| 3,169,121 | 2/1965 | Goldberg | 528/173 |
| 3,334,154 | 8/1967 | Kim | 525/439 |
| 3,915,926 | 10/1975 | Wambach | 525/439 |

*Primary Examiner*—J. Ziegler
*Attorney, Agent, or Firm*—Morgan, Finnegan, Pine, Foley & Lee

[57] ABSTRACT

Novel thermoplastic molding compositions are disclosed which comprise
(a) a polyalkylene terephthalate;
(b) a bisphenol-A polycarbonate; and
(c) an aromatic polyester carbonate.

24 Claims, No Drawings

TRANSPARENT COMPOSITIONS OF BISPHENOL-A-POLYCARBONATE, POLYALKYLENE TEREPHTHALATE AND AN AROMATIC POLYESTER CARBONATE

This is a continuation of application Ser. No. 869,529, filed Jan. 16, 1978, now abandoned.

This invention relates to the thermoplastic molding compositions of a polyalkylene terephthalate, a bisphenol-A polycarbonate and an aromatic polyester carbonate having improved molded transparency characteristics.

BACKGROUND OF THE INVENTION

Compositions of polyalkylene terephthalate and polycarbonate resins are well known and have been widely employed in the manufacture of thermoplastic molded articles.

U.S. Pat. No. 3,218,372 which is incorporated herein by reference, describes compositions of polyalkylene terephthalates and polycarbonate resins. These compositions are described as having reduced melt viscosity and higher ductility than either the polycarbonate or polyalkylene terephthalate alone.

Blends of polyalkylene terephthalates and bisphenol-A polycarbonate are known to yield transparent molded articles only in the range of up to about 10 to 12 percent by weight of the polyester component. Articles molded from blends of polyalkylene terephthalates and bisphenol-A polycarbonate having weight percentages of the polyalkylene terephthalate component greater than 12 percent appear translucent or opaque.

It has now been found that the incorporation of an amount of an aromatic polyester carbonate, alternatively known as aromatic polyester cocarbonates, into various blends of polyalkylene terephthalates and bisphenol-A polycarbonates allows the production of transparent molded articles with molding compositions having polyester concentrations significantly greater than 10 to 12 percent by weight.

DESCRIPTION OF THE INVENTION

The present invention provides for a novel thermoplastic molding composition which comprises:
(a) a polyalkylene terephthalate;
(b) a bisphenol-A polycarbonate; and
(c) an aromatic polyester carbonate.

Among the preferred polyalkylene terephthalates advantageously employed in the composition which is the subject of this invention are polyethylene terephthalate and poly(1,4-butylene terephthalate).

The poly(1,4-butylene terephthalate) should have an intrinsic viscosity between 0.4 and 1.2 dl/g. as measured at 30° C. in a 60/40 solution of phenol/tetrachloroethane. A more preferred range is between 0.6 and 0.9 dl/g.

The preferred bisphenol-A polycarbonate may be derived from the reaction of bisphenol-A and phosgene. These polycarbonates have from 100–400 recurring units of the formula:

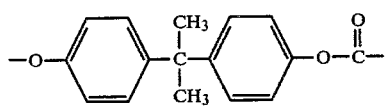

The polycarbonates are described in U.S. Pat. Nos. 3,028,365; 3,334,154 and 3,915,926, all of which are incorporated by reference. The polycarbonate should have an intrinsic viscosity between 0.3 and 1.0, preferably from 0.3 to 0.45 as measured at 20° C. in methylene chloride.

The preparation of the aromatic polyester carbonates which may be employed in the composition of the present invention are described in U.S. Pat. No. 3,169,121, which is incorporated herein by reference. The preferred polyester carbonate is a terpolymer resulting from the condensation of phosgene, terephthaloyl chloride, isophthaloyl chloride with bisphenol-A and a small amount of p-tertbutylphenol.

The polyalkylene terephthalate component of the composition of the present invention may comprise from 10 to 85 percent by weight of the composition, the bisphenol-A polycarbonate may comprise from 15 to 90 percent by weight of the composition and the aromatic polyester carbonate may comprise from 5 to 50 percent of the composition.

The preferred compositions will include from about 15 to about 50 percent by weight of polyalkylene terephthalate, from about 50 to about 90 percent by weight of bisphenol-A polycarbonate and from about 15 to about 25 percent by weight of the aromatic polyester component.

The composition of the present invention may be prepared by any standard procedure and the particular method employed is not considered critical.

The compositions may also include flame retardants such as those described in U.S. Pat. No. 3,915,926 which is incorporated herein by reference.

DESCRIPTION OF THE PREFERRED EMBODIMENTS

The following examples are set forth to further illustrate the present invention and are not to be construed as limiting the invention thereto.

EXAMPLE I

CONTROL

A blend of the following components was prepared and pre-dried for four hours at 200° F.

| | Percentage By Weight |
|---|---|
| Poly(1,4-butylene terephthalate)* | 45 |
| Bisphenol-A polycarbonate** | 55 |
| Aromatic polyester carbonate | 0 |

*Valox 310
**Lexan 145

The blend was then extruded on a Werner-Pfleiderer twin screw extruder and the resultant extruded blend molded on a Van Dorn molding unit into sample parts. The resultant molded parts were opaque.

EXAMPLE II

The following blend was prepared in the same manner as that for example I:

| | Percentage By Weight |
|---|---|
| Poly(1,4-butylene terephthalate)* | 40 |
| Bisphenol-A polycarbonate** | 50 |

| -continued | |
|---|---|
| | Percentage By Weight |
| Aromatic polyester carbonate | 10 |

*Valox 310
**Lexan 145

After extruding and molding parts in the same manner as in Example I, the parts appeared transparent.

EXAMPLE III

A blend was prepared in the same manner and ratios as in Example II, except that the poly(1,4-butylene terephthalate) component and aromatic polyester carbonate component were first extruded together and then re-extruded with the bisphenol-A polycarbonate component. The resultant extruded and molded parts were again transparent.

EXAMPLES IV–VII

Additional blends were prepared in the proportions indicated in Table I, in the same manner as specified in Example I. These blends were extruded and molded into test parts which demonstrated the visual characteristics indicated in Table I, i.e. all of these blends showed improved transparency for both the extrudate and the molded parts over that which would have been expected without the addition of the aromatic polyester carbonate component.

EXAMPLES VIII—XV

Additional blends were prepared in the proportions indicated in Table II. These blends were prepared as indicated in Example I and were then extruded on a Werner-Pfleiderer twin screw extruder with a 520° F. profile. Molded parts were then prepared in the same manner as those prepared in the previous examples. The visual characteristics of the extrudate and molded parts for each composition were as indicated in Table II.

EXAMPLES XVI–XXIII

Additional blends were prepared in the same manner as set forth in Example I, which were subsequently blended and molded parts prepared in accordance with the procedure followed in Example I. The various compositions of these blends as well as the physical properties and visual appearance of the extrudate and molded parts are set forth in Table III.

EXAMPLES XXIV–XXIX

Additional blends were prepared in the same manner as set forth in Example I, which were subsequently extruded and molded in accordance with the same procedure followed in Example I. The visual appearance and molded part is set forth in Table IV.

EXAMPLES XXX–XLVII

Additional blends were prepared using bisphenol-A polycarbonate, polyalkylene terephthalate alone and polyethylene terephthalate together with poly(1,4-butylene terephthalate) and an aromatic polyester carbonate along with various additives. These blends were prepared, extruded and molded in the same manner as previously set forth in Example I. The compositions and physical properties, including the percent light transmission obtained on the molded parts are set forth in Table V.

EXAMPLES XLVIII–LXXIII

Additional blends of bisphenol-A polycarbonate, polyethylene terephthalate alone and together with poly(1,4-butylene terephthalate) and an aromatic polyester carbonate, were prepared, extruded and molded in the same manner as set forth in Example I, except for Examples LV–LXI, in which the bisphenol-A was first extruded together with the aromatic polyester component and the resultant extrudate was re-extruded with the polyethylene terephthalate. The actual compositions and visual appearance of the extrudate and molded parts are set forth in Table VI.

TABLE I

| | (EXAMPLES IV–VII) | | | |
|---|---|---|---|---|
| COMPOSITION (WT %) | EXAMPLE IV | EXAMPLE V | EXAMPLE VI | EXAMPLE VII |
| Bisphenol-A polycarbonate* | — | — | 20 | 20 |
| Poly(1,4-butylene terephthalate)** | 50 | 70 | 60 | 60 |
| Aromatic polyester carbonate | 50 | 30 | 20 | 20 |
| ADDITIVES (WT %) | | | | |
| ARGUS Q-135 Phosphite Epoxide Mixture | — | — | — | 0.2% |
| VISUAL APPEARANCE (Clarity) | | | | |
| Extrudate | Transparent | Transparent | Transparent | Transparent |
| Molded Part | | | | |
| .062 inch Thickness | Transparent | Transparent | Transparent | Transparent |
| .125 inch Thickness | Transparent | Opaque | Transparent | Transparent |

*Lexan 145
**Valox 310

TABLE II

| | (EXAMPLES VIII–XV) | | | | | | | |
|---|---|---|---|---|---|---|---|---|
| COMPOSITION (WT %) | EXAMPLE VIII | EXAMPLE IX | EXAMPLE X | EXAMPLE XI | EXAMPLE XII | EXAMPLE XIII | EXAMPLE XIV | EXAMPLE XV |
| Bisphenol-A polycarbonate* | 100 | 90 | 90 | 90 | 80 | 90 | 90 | 65 |
| Poly(1,4-butylene terephthalate)** | — | — | 10 | 5 | 10 | 5 | — | 10 |
| Aromatic polyester carbonate | — | 10 | — | 5 | 10 | — | 5 | 20 |
| Polycarbonate- | — | — | — | — | — | 5 | 5 | 5 |

TABLE II-continued

(EXAMPLES VIII-XV)

| COMPOSITION (WT %) | EXAMPLE VIII | EXAMPLE IX | EXAMPLE X | EXAMPLE XI | EXAMPLE XII | EXAMPLE XIII | EXAMPLE XIV | EXAMPLE XV |
|---|---|---|---|---|---|---|---|---|
| silane copolymer | | | | | | | | |
| ADDITIVES (WT %) | | | | | | | | |
| ARGUS Q-135 Phosphite Epoxide Mixture | 0.1 | 0.1 | 0.1 | 0.1 | 0.1 | 0.1 | 0.1 | 0.1 |
| PHYSICAL PROPERTIES | | | | | | | | |
| Ductility (%) | 100% | 100% | 0% | 100% | 0% | 100% | 100% | 100% |
| Izod Impact (notched) (ft.lbs/in.n) | 16.8 | 15.45 | 2.68 | 16.1 | 2.68 | 15.45 | 16.8 | 13.44 |
| VISUAL APPEARANCE (Clarity) | | | | | | | | |
| Extrudate | Transparent | Transparent | Transparent | Transparent | Transparent | Translucent (White) | Translucent (White) | Translucent (White) |
| Molded Parts | Transparent | Transparent | Transparent | Transparent | Transparent | Translucent (White) | Translucent (White) | Translucent (White) |

*Lexan 145
**Valox 310

TABLE III

(EXAMPLES XVI-XXIII)

| COMPOSITION (WT %) | EXAMPLE XVI | EXAMPLE XVII | EXAMPLE XVIII | EXAMPLE XIX |
|---|---|---|---|---|
| Bisphenol-A polycarbonate | 50% (Lexan 140) | 50% (Lexan 100) | 50% (Lexan 130) | 50% (Lexan 150) |
| Poly(1,4-butylene terephthalate) | 40% (Valox 310) | 40% (Valox 310) | 40% (Valox 310) | 40% (Valox 310) |
| Aromatic polyester carbonate | 10% | 10% | 10% | 10% |
| ADDITIVES (WT %) | | | | |
| 2,4,5 Trichlorobenzene sulfonate sodium salt | — | — | — | — |
| Ferro 203 (R-524) Barium octanoate/phosphite stabilizer | — | — | — | — |
| PHYSICAL PROPERTIES | | | | |
| Izod Impact (notched) (ft.lbs/in.n) | 1.46 | 1.46 | 1.46 | 1.46 |
| Heat Deflection Temperature (°C.) | | | | |
| - As Molded | 90 | — | <90 | — |
| - Aged 1 hour at 400° F. | 112 | — | 113 | — |
| VISUAL APPEARANCE (Clarity) | | | | |
| Extrudate | Transparent | Transparent | Transparent | Transparent |
| Molded Parts | Transparent | Transparent | Transparent | Transparent |

| COMPOSITION (WT %) | EXAMPLE XX | EXAMPLE XXI | EXAMPLE XXII | EXAMPLE XXIII |
|---|---|---|---|---|
| Bisphenol-A polycarbonate | 50% (Lexan 150) | 50% (Lexan 150) | 50% (Lexan 100) | 50% (Lexan 100) |
| Poly(1,4-butylene terephthalate) | 40% (Valox 310) | 40% (Valox 310) | 40% (Valox 310) | 40% (Valox 310) |
| Aromatic polyester carbonate | 10% | 10% | 10% | 10% |
| ADDITIVES (WT %) | | | | |
| 2,4,5 Trichlorobenzene sulfonate sodium salt | — | — | 0.5% | 0.1% |
| Ferro 203 (R-524) Barium octanoate/phosphite stabilizer | 0.5% | 0.1% | — | — |
| PHYSICAL PROPERTIES | | | | |
| Izod Impact (notched) (ft.lbs/in.n) | 1.44 | 1.3 | 1.64 | 1.31 |
| Heat Deflection Temperature (°C.) | | | | |
| - As Molded | 104 | 94 | — | — |
| - Aged 1 hour at 400° F. | 131 | 133 | — | — |
| VISUAL APPEARANCE (Clarity) | | | | |
| Extrudate | Translucent | Translucent | Translucent | Translucent |
| Molded Parts | Translucent | Translucent | Translucent | Translucent |

TABLE IV

(EXAMPLES XXIV-XXIX)

| COMPOSITION (WT %) | EXAMPLE XXIV | EXAMPLE XXV | EXAMPLE XXVI |
|---|---|---|---|
| Bisphenol-A polycarbonate | 50% (Lexan 130) | 50% (Lexan 130) | 50% (Lexan 100) |
| Polyethylene terephthalate | 40% | 20% | 10% |
| Poly(1,4-butylene terephthalate) | — | 20% (Valox 310) | 30% (Valox 310) |
| Aromatic polyester carbonate | 10% | 10% | 10% |
| ADDITIVES (WT %) | | | |
| 2,4,5 Trichlorobenzene sulfate sodium salt | — | — | — |
| EPSANE ® | — | — | — |

TABLE IV-continued
(EXAMPLES XXIV–XXIX)

| VISUAL APPEARANCE (Clarity) | | | |
|---|---|---|---|
| Extrudate | Transparent | Transparent | Transparent |
| Molded Parts | Transparent | Transparent | Transparent |

| COMPOSITION (WT %) | EXAMPLE XXVII | EXAMPLE XXVIII | EXAMPLE XXIX |
|---|---|---|---|
| Bisphenol-A polycarbonate | 90% (Lexan 100) | 85% (Lexan 100) | 33⅓% (Lexan 100) |
| Polyethylene terephthalate | — | — | — |
| Poly(1,4-butylene terephthalate) | 4.5% (Valox 310) | 2.75% (Valox 310) | — |
| Aromatic polyester carbonate | 4.5% | 12.25% | 33⅓% |
| ADDITIVES (WT %) | | | |
| 2,4,5 Trichlorobenzene sulfate sodium salt | 1.0% | 0.5% | — |
| EPSANE ® | — | — | 33⅓% |
| VISUAL APPEARANCE (Clarity) | | | |
| Extrudate | Translucent | Translucent | Opaque |
| Molded Parts | Translucent | Translucent | Opaque |

TABLE V
(EXAMPLE XXX–XLVII)

| COMPOSITION (WT %) | EXAMPLE XXX | EXAMPLE XXXI | EXAMPLE XXXII | EXAMPLE XXXIII |
|---|---|---|---|---|
| Bisphenol-A polycarbonate | 20% (Lexan 140) | 20% (Lexan 120) | 20% (Lexan 120) | 20% (Lexan 140) |
| Polyethylene terephthalate | — | — | — | — |
| Poly(1,4-butylene terephthalate) | 60% (Valox 310) | 60% (Valox 310) | 60% (Valox 310) | 60% (Valox 310) |
| Aromatic polyester carbonate | 20% | 20% | 20% | 20% |
| ADDITIVES (WT %) | | | | |
| Methyl phenyl siloxane | — | — | 1% | — |
| Dipentaerythritol | — | — | — | 1% |
| Bis glycidyl ether of bisphenol-A (epoxy) | — | — | — | — |
| PHYSICAL PROPERTIES | | | | |
| Ductility (%) | 100 | 80 | 100 | .0 |
| Izod Impact (notched) (ft.lbs/in.n) | 30.4 | 23.2 | 29.63[1] | 0.64 |
| Percent Light Transmission | 68.1 | 70.5 | 68.6 | 70.4 |

| COMPOSITION (WT %) | EXAMPLE XXXIV | EXAMPLE XXXV | EXAMPLE XXXVI | EXAMPLE XXXVII |
|---|---|---|---|---|
| Bisphenol-A polycarbonate | 20% (Lexan 140) | 40% (Lexan 140) | 20% (Lexan 140) | 20% (Lexan 140) |
| Polyethylene terephthalate | 10% | 60% | 60% | 55% |
| Poly(1,4-butylene terephthalate) | 50% (Valox 310) | — | — | 5% (Valox 310) |
| Aromatic polyester carbonate | 20% | — | 20% | 20% |
| ADDITIVES (WT %) | | | | |
| Methyl phenyl siloxane | 0.3 | — | — | — |
| Dipentaerythritol | — | — | — | — |
| Bis glycidyl ether of bisphenol-A (epoxy) | — | — | — | — |
| PHYSICAL PROPERTIES | | | | |
| Ductility (%) | 0 | 0 | 0 | 0 |
| Izod Impact (notched) (ft.lbs/in.n) | 1.71 | 0.66 | 0.92 | 0.66 |
| Percent Light Transmission | 70.5 | 54.5 | 29.7 | 66.3 |

| COMPOSITION (WT %) | EXAMPLE XXXVIII | EXAMPLE XXXIX | EXAMPLE XL | EXAMPLE XLI |
|---|---|---|---|---|
| Bisphenol-A polycarbonate | 20% (Lexan 140) | 20% (Lexan 140) | 12.5% (Lexan 140) | 12.5% (Lexan 140) |
| Polyethylene terephthalate | 50% | 40% | 50% | 50% |
| Poly(1,4-butylene terephthalate) | 10% (Valox 310) | 20% (Valox 310) | 12.5% (Valox 315) | 12.5% (Valox 315) |
| Aromatic polyester carbonate | 20% | 20% | 25% | 25% |
| ADDITIVES (WT %) | | | | |
| Methyl phenyl siloxane | — | — | — | — |
| Dipentaerythritol | — | — | — | — |
| Bis glycidyl ether of bisphenol-A (epoxy) | — | — | — | — |
| PHYSICAL PROPERTIES | | | | |
| Ductility (%) | 0 | 0 | 0 | 0 |
| Izod Impact (notched) (ft.lbs/in.n) | 0.79 | 0.93 | 0.65 | 0.65 |
| Percent Light Transmission | 72.5 | 71.8 | 63.1 | 66.2 |

| COMPOSITION (WT %) | EXAMPLE XLII | EXAMPLE XLIII | EXAMPLE XLIV |
|---|---|---|---|
| Bisphenol-A polycarbonate | 20% (Lexan 140) | 20% (Lexan 140) | 20% (Lexan 140) |
| Polyethylene terephthalate | 10% | 10% | — |
| Poly(1,4-butylene terephthalate) | 50% (Valox 315) | 50% (Valox 315) | 60% (Valox 315) |
| Aromatic polyester carbonate | 20% | 20% | 20% |
| ADDITIVES (WT %) | | | |
| Methyl phenyl siloxane | — | — | — |
| Dipentaerythritol | — | — | — |
| Bis glycidyl ether of | | | |

TABLE V-continued
(EXAMPLE XXX-XLVII)

| | | | |
|---|---|---|---|
| bisphenol-A (epoxy) | | | |
| PHYSICAL PROPERTIES | | | |
| Ductility (%) | 0 | 0 | 80 |
| Izod Impact (notched) (ft.lbs/in.n) | 0.65 | 1.31 | 24.6 |
| Percent Light Transmission | 71.3 | 63.6 | 66.2 |

| COMPOSITION (WT %) | EXAMPLE XLV | EXAMPLE XLVI | EXAMPLE XLVII |
|---|---|---|---|
| Bisphenol-A polycarbonate | 20% (Lexan 140) | 20% (Lexan 140) | 20% (Lexan 140) |
| Polyethylene terephthalate | — | 60% | 60% |
| Poly(1,4-butylene terephthalate) | 60% (Valox 315) | — | — |
| Aromatic polyester carbonate | 20% | 20% | 20% |
| ADDITIVES (WT %) | | | |
| Methyl phenyl siloxane | — | — | — |
| Dipentaerythritol | — | — | — |
| Bis glycidyl ehter of bisphenol-A (epoxy) | 1% | 1% | 5% |
| PHYSICAL PROPERTIES | | | |
| Ductility (%) | 40 | 0 | 0 |
| Izod Impact (notched) (ft.lbs/in.n) | 11.6 | 1.3 | 0.98 |
| Percent Light Transmission | 75.1 | 72.5 | 76.4 |

[1]Impact strength unexpectedly high.

TABLE VI
(EXAMPLES XLVIII-LXXIII)

| COMPOSITION (WT %) | EXAMPLE XLVIII | EXAMPLE XLIX | EXAMPLE L | EXAMPLE LI |
|---|---|---|---|---|
| Bisphenol-A polycarbonate | 20% (Lexan 140) | 20% (Lexan 140) | 20% (Lexan 140) | — |
| Polyethylene terephthalate | 60% | 60% | — | 60% |
| Poly(1,4-butylene terephthalate) | — | — | 60% (Valox 315) | — |
| Aromatic polyester carbonate | 20% | 20% | 20% | 40% |
| ADDITIVES (WT %) | | | | |
| 6906 XP - Rohm & Haas Acryloid[2] | — | 0.5% | 0.5% | — |
| Epoxy stabilized octa decyl phenyl phosphite | — | — | — | — |
| Octa decyl phenyl phosphite | — | — | — | — |
| Cycloaliphatic epoxy ester | — | — | — | — |
| VISUAL APPEARANCE (Clarity) | | | | |
| Extrudate | Transparent | Translucent | Transparent | Transparent |
| Molded Parts | Transparent | Translucent | Transparent | Transparent |

| COMPOSITION (WT %) | EXAMPLE LII | EXAMPLE LIII | EXAMPLE LIV[1] | EXAMPLE LV[1] |
|---|---|---|---|---|
| Bisphenol-A polycarbonate | — | 30% (Lexan 100) | 25% (Lexan 140) | 30% (Lexan 140) |
| Polyethylene terephthalate | 40% | 40% | 50% | 40% |
| Poly(1,4-butylene terephthalate) | — | — | — | — |
| Aromatic polyester carbonate | 60% | 30% | 25% | 30% |
| ADDITIVES (WT %) | | | | |
| 6906 XP - Rohm & Haas Acryloid[2] | — | — | — | — |
| Epoxy stabilized octa decyl phenyl phosphite | — | — | — | — |
| Octa decyl phenyl phosphite | — | — | — | — |
| Cycloaliphatic epoxy ester | — | — | — | — |
| VISUAL APPEARANCE (Clarity) | | | | |
| Extrudate | Transparent | Transparent | Transparent | Transparent |
| Molded Parts | Transparent | Transparent | Transparent | Transparent |

| COMPOSITION (WT %) | EXAMPLE LVI[1] | EXAMPLE LVII[1] | EXAMPLE LVIII[1] | EXAMPLE LIX[1] |
|---|---|---|---|---|
| Bisphenol-A polycarbonate | 35% (Lexan 140) | 40% (Lexan 140) | 30% (Lexan 120) | 40% (Lexan 120) |
| Polyethylene terephthalate | 30% | 20% | 55% | 40% |
| Poly(1,4-butylene terephthalate) | — | — | — | — |
| Aromatic polyester carbonate | 35% | 40% | 15% | 20% |
| ADDITIVES (WT %) | | | | |
| 6906 XP - Rohm & Haas Acryloid[2] | — | — | — | — |
| Epoxy stabilized octa decyl phenyl phosphite | — | — | — | — |
| Octa decyl phenyl phosphite | — | — | — | — |
| Cycloaliphatic epoxy ester | — | — | — | — |
| VISUAL APPEARANCE (Clarity) | | | | |
| Extrudate | Transparent | Transparent | Transparent | Transparent |
| Molded Parts | Transparent | Transparent | Transparent | Transparent |

| COMPOSITION (WT %) | EXAMPLE LX[1] | EXAMPLE LXI[1] | EXAMPLE LXII | EXAMPLE LXIII |
|---|---|---|---|---|
| Bisphenol-A polycarbonate | 50% (Lexan 120) | 60% (Lexan 120) | 30% (Lexan 130) | 30% (Lexan 130) |
| Polyethylene terephthalate | 25% | 10% | 40% | 40% |
| Poly(1,4-butylene terephthalate) | — | — | — | — |
| Aromatic polyester carbonate | 25% | 30% | 30% | 30% |

TABLE VI-continued
(EXAMPLES XLVIII-LXXIII)

| COMPOSITION (WT %) | | | | |
|---|---|---|---|---|
| ADDITIVES (WT %) | | | | |
| 6906 XP - Rohm & Haas Acryloid[2] | — | — | — | — |
| Epoxy stabilized octa decyl phenyl phosphite | — | — | 0.1%— | 0.2%— |
| Octa decyl phenyl phosphite | — | — | — | — |
| Cycloaliphatic epoxy ester | — | — | — | — |
| VISUAL APPEARANCE (Clarity) | | | | |
| Extrudate | Transparent | Transparent | Transparent | Transparent |
| Molded Parts | Transparent | Transparent | Transparent[3] | Transparent[3] |

| COMPOSITION (WT %) | EXAMPLE LXIV | EXAMPLE LXV | EXAMPLE LXVI | EXAMPLE LXVII |
|---|---|---|---|---|
| Bisphenol-A polycarbonate | 20% (Lexan 140) | 20% (Lexan 140) | 20% (Lexan 140) | 20% (Lexan 140) |
| Polyethylene terephthalate | 10% | — | — | — |
| Poly(1,4-butylene terephthalate) | 50% (Valox 315) | 60% (Valox 315) | 60% (Valox 315) | 60% (Valox 315) |
| Aromatic polyester carbonate | 20% | 20% | 20% | 20% |
| ADDITIVES (WT %) | | | | |
| 6906 XP - Rohm & Haas Acryloid[2] | — | — | — | — |
| Epoxy stabilized octa decyl phenyl phosphite | 0.2% | 0.1% | — | — |
| Octa decyl phenyl phosphite | — | — | — | — |
| Cycloaliphatic epoxy ester | — | — | — | — |
| VISUAL APPEARANCE (Clarity) | | | | |
| Extrudate | Transparent | Transparent | Transparent | Transparent |
| Molded Parts | Transparent[3] | Transparent[3] | Transparent | Transparent |

| COMPOSITION (WT %) | EXAMPLE LXVIII | EXAMPLE LXIX | EXAMPLE LXX |
|---|---|---|---|
| Bisphenol-A polycarbonate | 20% (Lexan 140) | 20% (Lexan 140) | 20% (Lexan 140) |
| Polyethylene terephthalate | — | — | — |
| Poly(1,4-butylene terephthalate) | 60% (Valox 315) | 60% (Valox 315) | 60% (Valox 315) |
| Aromatic polyester carbonate | 20% | 20% | 20% |
| ADDITIVES (WT %) | | | |
| 6906 XP - Rohm & Haas Acryloid[2] | — | — | — |
| Epoxy stabilized octa decyl phenyl phosphite | — | — | — |
| Octa decyl phenyl phosphite | 0.2% | 0.5% | — |
| Cycloaliphatic epoxy ester | — | — | 0.5% |
| VISUAL APPEARANCE (Clarity) | | | |
| Extrudate | Transparent | Transparent | Transparent |
| Molded Parts | Transparent[3] | Transparent[3] | Transparent[4] |

| COMPOSITION (WT %) | EXAMPLE LXXI | EXAMPLE LXXII | EXAMPLE LXXIII |
|---|---|---|---|
| Bisphenol-A polycarbonate | 20% (Lexan 140) | 20% (Lexan 140) | 20% (Lexan 140) |
| Polyethylene terephthalate | — | 10% | 20% |
| Poly(1,4-butylene terephthalate) | 60% (Valox 315) | 50% (Valox 315) | 40% (Valox 315) |
| Aromatic polyester carbonate | 20% | 20% | 20% |
| ADDITIVES (WT %) | | | |
| 6906 XP - Rohm & Haas Acryloid[2] | — | — | — |
| Epoxy stabilized octa decyl phenyl phosphite | 0.5% | — | — |
| Octa decyl phenyl phosphite | — | — | — |
| Cycloaliphatic epoxy ester | — | 0.2% | 0.2% |
| VISUAL APPEARANCE (Clarity) | | | |
| Extrudate | Transparent | Transparent | Transparent |
| Molded Parts | Transparent[3] | Transparent[4] | Transparent[4] |

[1] In Examples LV to LXI the bisphenol-A polycarbonate was first extruded together with the aromatic polyester component and the resultant extrudate was re-extruded together with the polyethylene-terephthalate component.
[2] Previously found to be transparent in bisphenol-A polycarbonate
[3] Crystallized upon heat aging for 1 hour at 125° C.
[4] Only retained transparency on heat aging for 1 hour at 125° C.

Although the above examples show various modifications of the present invention, other variations are possible in light of the above teachings.

It is, therefore, to be understood that changes may be made in the particular embodiment of the invention described which are within the full intended scope of the invention, as defined by the appended claims.

We claim:

1. A thermoplastic molding composition, which after molding is transparent, said composition comprising
   (a) a polyalkylene terephthalate;
   (b) a bisphenol-A polycarbonate; and
   (c) an aromatic polyester carbonate,
wherein the total amount of component (a) exceeds about 10 to 12 percent by weight of the total composition.

2. The thermoplastic molding composition of claim 1 wherein the polyalkylene terephthalate is polyethylene terephthalate.

3. The thermoplastic molding composition of claim 1 wherein the polyalkylene terephthalate is poly(1,4-butylene terephthalate).

4. The thermoplastic molding composition of claim 1 wherein the polyalkylene terephthalate component is a mixture of polyethylene terephthalate and poly(1,4-butylene terephthalate).

5. The thermoplastic molding composition of claim 1 wherein the polyester carbonate is a terpolymer resulting from the condensation of phosgene, terephthaloyl chloride, isophthaloyl chloride with bisphenol-A and a small amount of p-tertbutylphenol.

6. The thermoplastic molding composition of claim 1 wherein the bisphenol-A polycarbonate has from 100–400 recurring units of the formula:

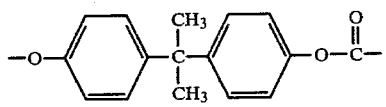

7. A thermoplastic molding composition as defined in claim 1 which includes a flame retardant amount of a flame retardant agent.

8. A thermoplastic molding composition which after molding is transparent, which comprises
    (a) from 90 to 15 percent by weight of a bisphenol-A polycarbonate;
    (b) from 10 to 85 percent by weight of a polyalkylene terephthalate; and
    (c) from 5 to 50 percent by weight of an aromatic polyester carbonate.

9. A method for producing a transparent molded article which comprises preparing (a) a polyalkylene terephthalate in admixture with (b) a bisphenol-A polycarbonate, wherein the total amount of the polyester component (a) exceeds about 10 to 12 percent by weight of the total composition, adding to said mixture an amount of (c) an aromatic polyester carbonate and subjecting the total composition to a molding operation.

10. A method according to claim 9 wherein the polyalkylene terephthalate component is polyethylene terephthalate.

11. A method according to claim 9 wherein the polyalkylene terephthalate component is poly(1,4-butylene terephthalate).

12. A method according to claim 9 wherein the polyalkylene terephthalate component is a mixture of polyethylene terephthalate and poly(1,4-butylene terephthalate).

13. A method according to claim 9 wherein the aromatic polyester carbonate (c) is a terpolymer resulting from the condensation of phosgene, terephthaloyl chloride, isophthaloyl chloride with bisphenol-A and a small amount of p-tertbutylphenol.

14. A method according to claim 9 wherein the bisphenol-A polycarbonate has from 100–400 recurring units of the formula:

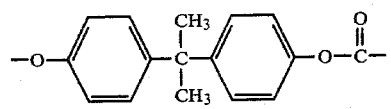

15. A method according to claim 9 which comprises preparing (a) 90 to 15 percent by weight of a bisphenol-A polycarbonate in admixture with (b) from 10 to 85 percent by weight of a polyalkylene terephthalate, adding to said mixture (c) from 5 to 50 percent by weight of an aromatic polyester carbonate and subjecting the total composition to a conventional molding operation.

16. A method according to claim 9 wherein the molded article comprising the components (a), (b) and (c), also includes a flame retardant amount of a flame retardant agent.

17. A thermoplastic molding composition, which after molding is transparent, said composition consisting essentially of
    (a) a polyalkylene terephthalate;
    (b) a bisphenol-A polycarbonate; and
    (c) an aromatic polyester carbonate, wherein the total amount of component (a) exceeds about 10 to 12 percent by weight of the total composition.

18. The thermoplastic molding composition of claim 17 wherein the polyalkylene terephthalate is polyethylene terephthalate.

19. The thermoplastic molding composition of claim 17 wherein the polyalkylene terephthalate is poly(1,4-butylene terephthalate).

20. The thermoplastic molding composition of claim 17 wherein the polyalkylene terephthalate component is a mixture of polyethylene terephthalate and poly(1,4-butylene terephthalate).

21. The thermoplastic molding composition of claim 17 wherein the polyester carbonate is a terpolymer resulting from the condensation of phosgene, terephthaloyl chloride, isophthaloyl chloride with bisphenol-A and a small amount of p-tertbutylphenol.

22. The thermoplastic molding composition of claim 18 wherein the bisphenol-A polycarbonate has from 100–400 recurring units of the formula:

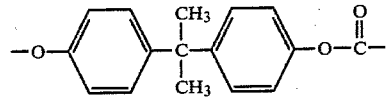

23. A thermoplastic molding composition as defined in claim 17 which includes a flame retardant amount of a flame retardant agent.

24. A thermoplastic molding composition, which after molding is transparent, consisting essentially of
    (a) from 90 to 15 percent by weight of a bisphenol-A polycarbonate;
    (b) from 10 to 85 percent by weight of a polyalkylene terephthalate; and
    (c) from 5 to 50 percent by weight of an aromatic polyester carbonate.

* * * * *